(12) United States Patent
Erlebacher

(10) Patent No.: US 12,508,422 B2
(45) Date of Patent: Dec. 30, 2025

(54) ULTRASOUND GUIDANCE ASSEMBLY AND SYSTEM

(71) Applicant: Jay Erlebacher, Tenafly, NJ (US)

(72) Inventor: Jay Erlebacher, Tenafly, NJ (US)

(*) Notice: Subject to any disclaimer, the term of this patent is extended or adjusted under 35 U.S.C. 154(b) by 400 days.

(21) Appl. No.: 17/984,176

(22) Filed: Nov. 9, 2022

(65) Prior Publication Data
US 2023/0144919 A1  May 11, 2023

Related U.S. Application Data

(60) Provisional application No. 63/286,224, filed on Dec. 6, 2021, provisional application No. 63/277,809, filed on Nov. 10, 2021.

(51) Int. Cl.
*A61N 1/05* (2006.01)
*A61B 5/06* (2006.01)
*A61B 18/14* (2006.01)

(52) U.S. Cl.
CPC ............ *A61N 1/0573* (2013.01); *A61B 5/066* (2013.01); *A61N 1/056* (2013.01); *A61B 18/1492* (2013.01)

(58) Field of Classification Search
None
See application file for complete search history.

(56) References Cited

U.S. PATENT DOCUMENTS

2013/0096432 A1* 4/2013 Hauck ............... A61B 8/5292
                                                          600/440
2020/0197693 A1* 6/2020 Liu ................... A61N 1/0573

* cited by examiner

*Primary Examiner* — Michael W Kahelin
(74) *Attorney, Agent, or Firm* — Skaar Ulbrich Macari, P.A.

(57) ABSTRACT

A pacemaker lead-guide catheter kit and system having anatomical target detection and distance measurement capabilities that aid in more precise lead implantation. The kit and system comprises a guide catheter and a lead, either or both of which include at least one ultrasound transducer that is used to more precisely implant the lead. The guide catheter may include an optical viewing assembly or window capable of displaying indicia on a portion of the guide catheter, pacing lead, or other medical apparatus. The optical viewing assembly is configured to display or transmit an image of the indicia which represents a distance from an end of the guide catheter or an end of a lead to the anatomical target. Additionally, the optical viewing assembly and indicia enables a Cardiologist to determine the location and/or depth of penetration of the lead.

13 Claims, 13 Drawing Sheets

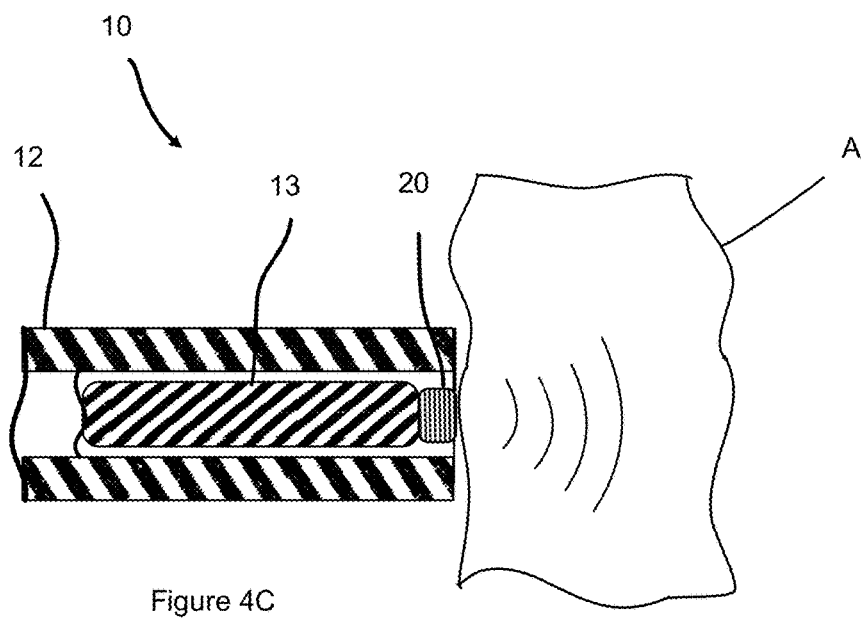
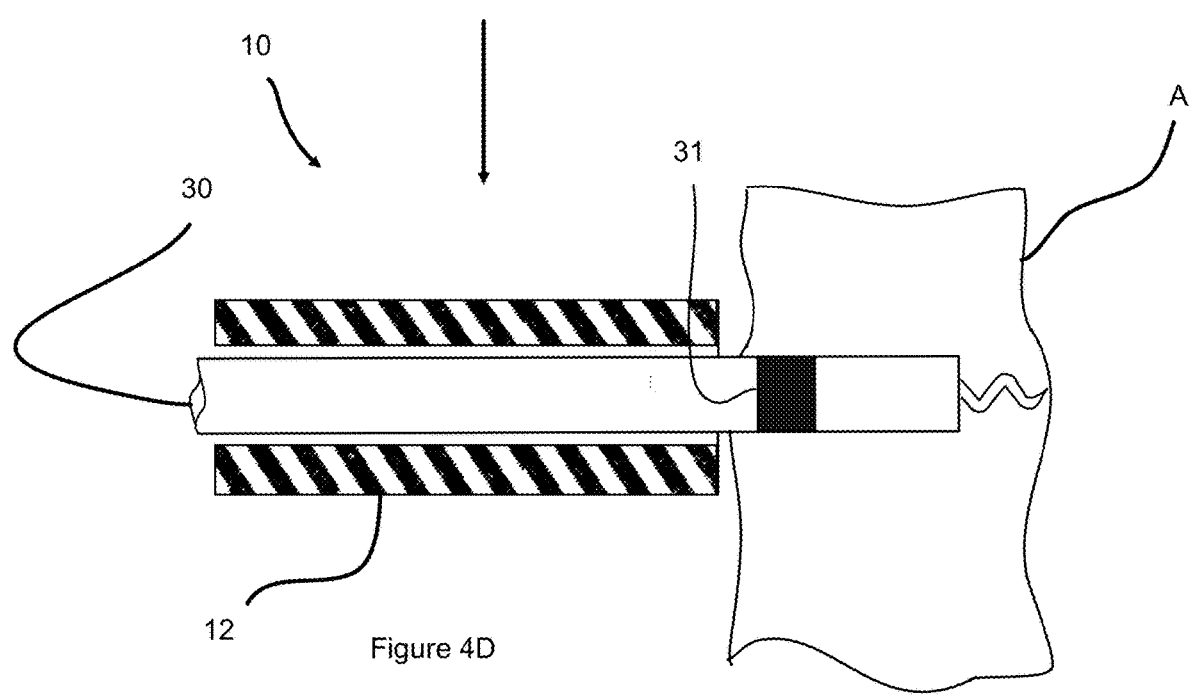

ULTRASOUND GUIDANCE ASSEMBLY AND SYSTEM

CROSS REFERENCES TO RELATED APPLICATIONS

This application claims the benefit of U.S. Provisional Patent Application No. 63/277,809, filed Nov. 10, 2021 and U.S. Provisional Patent Application No. 63/286,224, filed on Dec. 6, 2021, which are incorporated herein in their entirety by reference.

FIELD

The present invention relates generally to a guidance assembly and system, and more particularly to a guidance catheter-pacemaker lead system or kit capable of determining a location and/or measuring a depth of a lead, including cardiac rapid deployment of left bundle area trans-septal cardiac pacemaker leads.

BACKGROUND

Standard Right Ventricular Pacing Vs Conduction System Pacing:

The normal heart stimulates the ventricles though specialized conduction tissue that spreads electrical signals rapidly through the bundle of His and then to the right and left bundles extending along the interventricular septum of the heart to produce near simultaneous stimulation of the ventricles within a time span of approximately 80 mSec. When a normal heart becomes injured or diseased cardiac pacing technology is generally required to maintain or restore the heart to normal cardiac function.

Cardiac pacing technology is generally implanted within a chest cavity of a patient. The pacing technology generally comprises a pacemaker and one or more leads capable of conducting electrical impulses from the pacemaker to the injured or diseased heart. The pacemaker lead generally comprises one or more wires or coils covered by a non-conductive sheath. Cardiac pacemaker leads are also able to detect the natural electrical impulses of the heart. As such, a cardiac pacemaker is able to time electrical impulses delivered to the heart.

The pacemaker lead may be implanted in the patient by various techniques or surgical approaches. These techniques and approaches include accessing the venous system by a needle puncture to the subclavian vein or performing a direct cut-down via an incision in the chest wall to access the cephalic vein. Depending upon the approach, a cardiologist may access the venous system to insert a stylet driven lead or a lumen-less lead passed through a guide catheter. These conventional techniques and approaches attempt to aid a cardiologist in navigating a patient's vascular system, to implant the selected pacing lead in a particular target cardiac location. However, the conventional techniques and approaches have the disadvantage of requiring the implantation without direct visualization of the target cardiac location. As such, there is still a need for improved guide catheters and pacemaker leads that improve the accuracy of implanting the pacing lead in the target cardiac location.

When implanting a pacemaker, a right ventricular pacemaker lead is typically implanted by passing the pacing lead through a patient's vein to a region within that chamber. X-ray fluoroscopy provides an image of the outline of the heart, but not of the various internal structures of the heart. The motion of the pacemaker lead as it passes through the right atrium, the tricuspid valve and the different portions of the right ventricle gives sufficient information for placing the pacemaker lead tip in the apex or outflow tract of the right ventricle. However placing a pacemaker lead in the interventricular septum as required for left bundle pacing remains a challenge. Orienting the pacemaker lead so that it enters the septum at a perpendicular angle, and determining the appropriate depth of penetration through the interventricular septum so that the pacemaker lead tip is positioned just proximal to the left ventricular endocardium are tasks that are not aided by fluoroscopy.

Since the 1960s transvenous pacemaker leads have been used to send timed electrical impulses to the right ventricle of the heart to stimulate and restore a normal heart rate in patients with a slow heartbeat. The heart's specialized conduction system rapidly stimulates both the right and left ventricles in 80 mSec or less, causing near simultaneous and synchronous contraction of the ventricles. When the heart is stimulated by a right ventricular pacemaker lead, however, the heart muscle itself is stimulated, bypassing the specialized conduction system. As a result, the electrical signal introduced by the pacemaker lead flows slowly though the ventricular muscle over a span of approximately 140 mSec or more, resulting in dyssynchronous contraction of the ventricles. Several adverse consequences frequently follow, including impairment of left ventricular function as measured by the ejection fraction, often resulting in heart failure. Right ventricular pacing is also associated with a higher incidence of atrial fibrillation which may lead to strokes and other complications.

Several approaches have been taken to address the issues raised by right ventricular pacing. One technique is to use the right ventricular lead in conjunction with a left ventricular lead threaded retrograde into the coronary sinus and branches of a coronary vein on the outer surface of the left ventricle. Simultaneous stimulation of both leads on opposite sides of the heart improves dyssynchrony of left ventricular contraction to a degree, but neither of the two pacemaker leads engage the specialized conduction system, and so slow conduction through the muscle, now from two sites, still does not optimize the left ventricle's contraction pattern. The biventricular pacing technique therefore fails to improve heart function in approximately 35% of patients.

Another approach to pace the heart engages the specialized conduction system by stimulating the bundle of His located at the base of the interventricular septum before it divides into the right and left bundles. The very base of the interventricular septum is at its thinnest at the membranous septum. The membranous septum attaches distally to the much thicker muscular septum which typically is 8-12 mm thick. The bundle of His runs through the membranous septum and then divides into the right and left bundle branches which are draped over the endocardial surface of the right and left sides of the interventricular septum respectively. When this technique is done successfully, the heart will contract synchronously, since the ventricles are rapidly stimulated in the normal physiologic manner through the specialized conduction system. While seemingly ideal, this technique is difficult to apply consistently and successfully.

In order to successfully stimulate the bundle of His it must first be located, which presents its own challenges. Typically, the bundle of His is found by searching for the low voltage His electrical potential, and then using a screw-in pacemaker lead to come close enough to the His bundle to stimulate it directly. This can be done in only 80-90% of cases in the best of hands. It generally requires 3 or more times the usual voltage to stimulate the bundle of His when compared to standard right ventricular pacing, leading to premature depletion of the pacemaker battery. Even more worrisome, is the tendency for some patients to require ever more voltage to stimulate the His bundle over time, sometimes with loss of the ability to pace altogether. Additionally, because the lead is fixated in the membranous septum and not in the ventricular muscle, the detected electrical activity of the ventricle is of much lower amplitude than that measured by a right ventricular lead in the heart muscle, and so sensing of the heart's action may be impaired. For these reasons, His bundle pacing is not widely used.

An alternate method of engaging the specialized conduction system was reported in 2017. In this technique, the pacemaker lead stimulates the left bundle branch of the specialized conduction system on the left side of the interventricular septum. The interventricular septum is the segment of heart muscle that separates the right and left ventricle. Pacing the left bundle produces near simultaneous stimulation of all of the left ventricle in a physiologic fashion and avoids the dyssynchonous contraction of the left ventricle that is characteristic of right ventricular pacing. Pacing the left bundle is accomplished by trans-septal placement of a screw-in pacing lead tunneled through the base of the interventricular septum from the right side to a subendocardial location in the left ventricle where it electrically stimulates the left bundle branch of the specialized conduction system. In so doing, it spreads the electrical stimulation to the entire left ventricle within approximately 80 mSec, which results in physiologic synchronous contraction of the left ventricle.

The procedure for accomplishing left bundle pacing, comprises delivering the screw-in pacemaker lead through a pre-shaped or steerable guiding catheter that is designed to position its tip at a location near the bundle of His. The bundle of His is located in the thin membranous septum, which is attached proximal to the much thicker muscular interventricular septum. The bundle of His vicinity is initially arrived at fluoroscopically and then by searching for the electrical signals produced by the atria and ventricles and finally the tiny electrical signal produced by the bundle of His. This provides an anatomic marker of the location of the membranous septum which is then saved as a fluoroscopic image as a reference. Unfortunately, the tiny His bundle electrogram is often difficult to locate and record in the presence of high grade electrical heart block, and may be impossible to detect in many other cases even with normal electrical conduction to the His bundle.

The appropriate location to begin screwing the lead into the interventricular septum is obtained by advancing the guide catheter distally 1-2 cm deeper into the right ventricle beyond the bundle of His, to the proximal portion of the muscular interventricular septum. Once a suitable location adjacent to the proximal interventricular muscular septum is found, the pacemaker lead is rotated clockwise to advance the lead by its helical corkscrew tip into the myocardium.

Pacing is commenced to stimulate the heart from the pacemaker lead. The final location of the lead tip is determined by performing a series of electrical measurements. After every 1-4 rotations of the helical screw, several measurements are made, including: 1) The electrical impedance, 2) The left ventricular activation time (LVAT) which is the time duration between the pacing stimulus artifact to the peak of the QRS wave recorded from an ECG lead on the left side of the chest between the 5th and 6th rib, or lead V5. 3). There is also close observation of the shape of the ECG signal recorded to the right of the sternum between the 3rd and 4th rib, known as lead V1. 4). As the lead is screwed in and burrows into the muscle, the electrical impedance tends to rise and then begins to fall with further advancement. The LVAT should shorten to no less than approximately 75-80 mSec. During pacing, the V1 lead QRS should initially demonstrate a "W" shape, and as the pacing lead approaches the left bundle, the notch in the middle of the "W" should move gradually to the right toward the end of the EKG complex, with a configuration known as an rsr'. In many cases, the left bundle electrical potential can be recorded when the lead is close to the left bundle.

While these measurements are recommended in the placement of left bundle area pacing leads, in practice these measurements do not routinely duplicate the above textbook examples due to variation of the electrical system and anatomy from patient to patient. Even when typical measurements are obtained, the stop and start incremental measurements required are time consuming and tedious, leading to much longer operative time compared to placement of a standard right ventricular pacemaker lead.

The critical measurement that the operator lacks in these procedures, is the exact distance and direction that the pacemaker lead must be screwed into the interventricular septum so that the tip of the pacemaker lead is subendocardial on the left side, and adjacent to the left bundle.

The penetration of the pacemaker lead into the interventricular septum can be estimated fluoroscopically by injecting contrast dye into the guide catheter, visualizing the right side of the interventricular septum. The depth of the lead can then be approximated by using the known dimensions of the lead. For instance, the Medtronic 3830 lead has a 1.8 mm long fixed screw at the tip, and a tip to ring distance of 9 mm. Although the penetration of the lead into the septum can be estimated with repeated contrast dye injections, this is a time-consuming technique and exposes patients, especially those with impaired kidney function, to contrast dye renal toxicity. Furthermore, none of these measurements reveal the most important measurement, that is, the location of the left side of the left ventricular endocardium on the far side of the interventricular septum, and how closely the lead tip has reached toward the left sided endocardium.

The thickness of the interventricular septum can be measured on routine echocardiography, but this measurement is of little use when the pacemaker lead can take a diagonal path from right to left side. In that case the distance to the left sided endocardium may be significantly longer than a perpendicular path. Not knowing the distance from the right to left side of the interventricular septum increases the risk of penetrating the septum and entering the left ventricle, where the exposed screw can cause a clot to form, posing a risk of stroke to the patient. Additionally, penetrating into the left ventricle will also cause loss of the ability to pace the heart when the helical screw electrode loses contact with the heart muscle. The risk of penetrating into the left ventricle often inhibits operators from advancing the lead to the most optimal location near the left ventricular subendocardium and the left bundle.

In summary, accurate placement of a left bundle area pacing lead using today's techniques and technology is tedious, time consuming, and potentially risky, limiting the application of this technique, despite its many advantages over right ventricular pacing. At the time of this invention small studies are showing that left bundle pacing even outperforms biventricular pacing. Furthermore, left bundle pacing with current techniques requires the facilities of an electrophysiology laboratory, while standard right ventricular pacing can be accomplished in any cardiac catheterization laboratory or operating room with fluoroscopy. Thus, the advantages of left bundle area pacing are not made available to the vast majority of patients.

Echocardiography:

Inge Edler and Carl Hertz were the first to record M-mode ultrasound echo signals from the beating heart in 1953. Cardiac ultrasound utilizes a piezoelectric transducer crystal which produces a high frequency pulse directed toward the heart, and then "listens" for the arrival of the reflections of these pulses from the various tissue interfaces along the path of the pulse. Knowing the time of arrival of each reflected pulse, and the speed of sound in the tissues, a highly accurate moving picture of the heart's structures can be reconstructed in a display across a screen. This is the principle of M mode echocardiography. M mode echocardiography has been in clinical use since the late 1960s. Further improvements with multi-crystal arrays have resulted in the ability to view two dimensional and even three dimensional moving images of the heart.

Applications for echocardiographic imaging within the heart using catheters have also been developed. Intracardiac echocardiography (ICE) is typically used to guide electrophysiology procedures. ICE is a dedicated catheter mounted echocardiography transducer using either a mechanically rotated crystal or a phased array of crystals at the distal tip of the catheter, which images intracardiac structures in two dimensions in a plane that is orthogonal to the catheter body.

Intravascular ultrasound (IVUS) is another catheter-based echocardiography system that images the walls of blood vessels to aid in the performance of cardiac interventional procedures such as coronary and peripheral stenting. Similar to ICE, it uses a mechanically rotated crystal or phased array of crystals to image cross sections of a blood vessel orthogonal to the catheter body.

To precisely implant a trans-septal pacemaker lead, an ultrasound catheter that can image in a direction coaxial to the catheter body is needed.

SUMMARY OF THE INVENTION

The present invention relates to an ultrasound guiding catheter and pacemaker lead system and kit that is used to aid a cardiologist in positioning a cardiac pacing device, such as a pacemaker lead tip or leadless pacemaker within the interventricular septum. The guiding catheter or cardiac pacing device is able to image desired anatomical locations/features, such as the interventricular septum, which allows a cardiologist to more closely locate the optimum target location for implantation of the tip of the pacing lead or leadless pacemaker.

The image guiding catheter system or kit is able to accurately measure a coaxial distance from a guiding catheter tip. The ability to accurately measure a coaxial distance is particularly important when placing cardiac trans-septal pacemaker leads or leadless pacemakers. From the right ventricle, the ultrasound guiding catheter system or kit is able to measure the distance from the right to the left side of the interventricular septum along a projected path of a pacemaker lead or leadless pacemaker and to assure that the path is perpendicular to the interventricular septal wall.

The guiding catheter of the present invention comprises components that facilitate the improved implantation of the cardiac pacing device. The guiding catheter is constructed having a generally elongated body that is insertable into an orifice of a body and at least one lumen configured to receive a cardiac pacing device such as a pacing lead (e.g., screw-in pacing lead) or leadless pacemaker. A guiding catheter tip and/or side wall of the catheter body includes one or more transducers (e.g., ultrasound) that are able to image in at least a coaxial direction. The proximal end of the guiding catheter can also include a measuring window with indicia that allows a cardiologist to measure a precise distance of coaxial movement of the pacing lead or leadless pacemaker moved within the lumen of the guiding catheter and into the interventricular septum. One skilled in the art will appreciate that a sheath having an ultrasound transducer can be used in place of the guide catheter.

Using the ultrasound transducer a cardiologist is able to obtain the necessary measurements needed to anchor the pacing lead tip or leadless pacemaker in the targeted location. Using the ultrasound technique, one may locate and image the thin membranous septum as an anatomic reference point without needing to make a His bundle recording. In this way one may avoid any reliance on recording a His bundle electrogram which is frequently not possible. In any case, once the anatomic reference point of the membranous septum has been identified and saved in a fluoroscopic image, the guide catheter is advanced distally 1-2 cm into the right ventricle where the M mode echo identifies the thicker interventricular septum with its characteristic contraction during cardiac systole. This allows precise anatomic positioning of the end or tip of the guide catheter or leadless pacemaker. As a cardiologist becomes more familiar with the technology and technique of the present invention, the time-consuming step of locating the His bundle potential may be eliminated. Thus, insertion of a left bundle pacemaker lead or leadless pacemaker would no longer require the recording of the His bundle potential, and therefore would not need to be performed in an electrophysiology equipped laboratory.

Given the difficulty of locating and recording the His bundle electrogram, there is a need for alternate methods for positioning the tip of the guide catheter adjacent to the muscular interventricular septum. The M-mode ultrasound method described above will reliably image the contracting myocardium of the septum. Another adjunctive method which may be utilized is by recording an intracardiac electrogram through the pacemaker lead tip. The helical screw-in lead tip is electrically active and is used to stimulate the heart. It is also used during lead insertion to record the intracardiac electrogram. When the helical electrode contacts the myocardium, it causes a large deflection of the ST segment of the electrocardiogram that is referred to as the current of injury. The ability to record the current of injury depends on the frequency response of the high pass filters of the recording equipment which must be set to permit such recordings. As the guide catheter and pacemaker lead tip positioned at the guide catheter opening crosses the tricuspid valve into the right ventricle, the QRS deflection becomes very large, showing entry into the right ventricle. When the pacemaker lead tip makes physical contact with the muscle of the interventricular septum, the current of injury appears. The transition of the QRS size and the appearance of the current of injury provide an alternate method of locating the proximal portion or base of the muscular interventricular septum. This serves as an alternate reference point from which the guide catheter and lead are advanced 1-2 cm distally into the right ventricle.

Recording the intracardiac electrogram by using the tip of the pacemaker lead depends on keeping the lead tip positioned at the end of the guide catheter. During manipulation of the guide catheter, the pacemaker lead may slip back and lose contact with the myocardium, or it may protrude beyond the guide catheter. It would be more convenient and reliable therefore to record the intracardiac electrogram from an electrode placed at the tip of the guide catheter itself. So in this case, the tip of the guide catheter would contain both an ultrasound electrode and an ECG recording electrode.

Once the appropriate location along the interventricular septum is arrived at, the pacemaker lead or leadless pacemaker is ready to be screwed or otherwise advanced into the septum toward the left side. The ultrasound technique of the present invention permits precise measurement of the thickness of the muscular interventricular septum, and will additionally indirectly indicate whether the direction of the catheter is perpendicular to the interventricular septal wall. As the guide catheter is torqued in either direction, the M mode image of the septum will appear thicker when the axis of the catheter is diagonally directed and thinner when it is perpendicular to the septum. After a good location perpendicular to the septum is obtained, the lead is screwed in to a measured depth that is subendocardial to the left ventricle. The distance of lead penetration or leadless pacemaker movement is measured from an optical gauge at the proximal end of the guide catheter or sheath. Other methods of locating the tip of the pacemaker lead or leadless pacemaker are possible, including contrast dye injection to visualize the right side of the septum, and passive or active ultrasound markers placed at the tip of the pacemaker lead or a portion of the or leadless pacemaker which shows the location of the pacemaker lead tip or leadless pacemaker in relation to the left ventricular endocardium. However, simplicity and accuracy favor the optical guide described in greater detail below.

The transducers of the present invention may comprise ultrasound send-receive crystal or crystals disposed in the guide catheter tip or sidewall and may be as simple as a single crystal recording an M mode tracing. A multi-crystal array may be used in a phased array that can display a two dimensional or three dimensional image of the interventricular septum, which may be useful for the additional spatial information that would be provided.

The present invention may utilize a standard non-imaging guide catheter through which a dedicated ultrasound tipped catheter is placed, temporarily replacing the pacemaker lead or leadless pacemaker. The ultrasound catheter is used to make a recording of the thickness and/or configuration of the interventricular septum, and then is exchanged for the pacing lead or leadless pacemaker, which will then be placed with knowledge of the interventricular wall thickness.

The present invention may also utilize a coaxial sheath containing an ultrasound transducer at its tip. The sheath having transducers may be placed external to a non-imaging guide catheter and advanced to a position at or near the right side of the interventricular septum for imaging of the septum. Once placed, the necessary measurements can be obtained and the pacing lead advanced through the lumen of the non-imaging catheter to the target location, where it is advanced through the septum.

The depth of penetration of the pacemaker lead tip or leadless pacemaker into the interventricular septum may be easily measured using distance markers inscribed on the pacemaker lead body or leadless pacemaker insertion device. The guide sheath has a known length from the hub to the tip of the guide catheter. The pacemaker lead or leadless pacemaker insertion device may be inscribed with a zero index mark coinciding with the distance from the guide catheter tip to a reference point on the hub or leadless insertion device. Additional millimeter markers are inscribed proximally on the pacemaker lead body or leadless pacemaker insertion device so that as the pacing lead or leadless pacemaker is advanced into the interventricular septum, the distance that the pacing lead tip or leadless pacemaker has moved out from the guide catheter may be read off the distance marker at the reference point on the guide catheter hub. With the guide catheter tip or sheath placed against the interventricular septum, the depth of septal penetration may be read directly from the markings on the body of pacemaker lead or leadless pacemaker insertion device.

Although this description is for use of ultrasound integrated into a guide catheter to coaxially measure tissue structures in the interventricular septum for purposes of placing left bundle branch pacemaker leads or leadless pacemaker, other applications in the cardiovascular system are envisioned. Such combinations of guide catheters and coaxial ultrasound would be useful in performing—other electrophysiology procedures such as puncturing the interatrial septum, performing cardiac ablations, renal artery denervation procedures, etc.

BRIEF DESCRIPTION OF THE DRAWINGS

FIG. 1A is an enlarged cross section view of a portion of FIG. 1 bounded by the phantom circle. A screw-in pacing lead is depicted within the lumen of the guiding catheter.

FIG. 1B is an enlarged cross section view of an ultrasound transducer positioned on an end of a guiding catheter according to an example embodiment of the invention.

FIG. 1C is an enlarged cross section view of an ultrasound transducer positioned about an end of a guiding catheter according to an example embodiment of the invention.

FIG. 1D is an enlarged cross section view of an ultrasound transducer positioned in a channel extending about an end of a guiding catheter according to an example embodiment of the invention.

FIG. 1E is an enlarged cross section view of a standard guide catheter used to place an ultrasound pacemaker lead having an ultrasound transducer positioned on an end of the pacemaker lead according to an example embodiment of the invention.

FIG. 3B.1 is an enlarged side view of the phantom circle of FIG. 3B.

FIG. 3C.1 is an enlarged end view of the phantom circle of FIG. 3C.

FIG. 4C is a cross section view of a standard guiding catheter with a catheter ultrasound probe in its lumen. The ultrasound probe is removed after measurements are made and replaced with the screw-in pacemaker lead.

FIG. 4D is a cross section view of the standard non-imaging guide catheter of FIG. 4C with a screw in pacemaker lead within its lumen and implanted in the septum. The standard non-imaging guide catheter is removed after implantation of the screw-in pacemaker lead.

Figure 1:
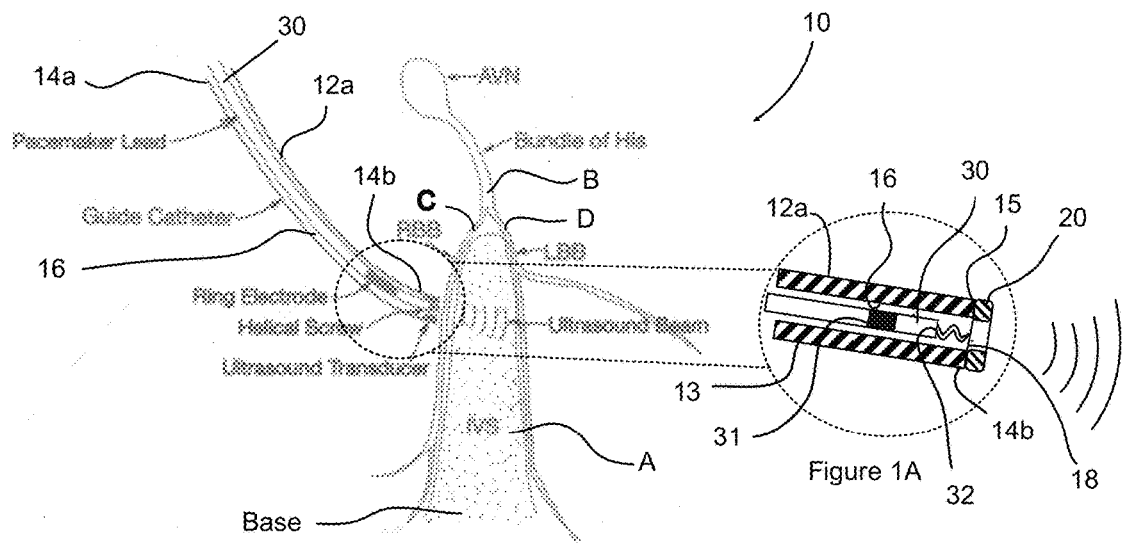
FIG. 1 is a perspective view of the ultrasound guiding system in a pre-deployment configuration according to an example embodiment.
Figure 1:
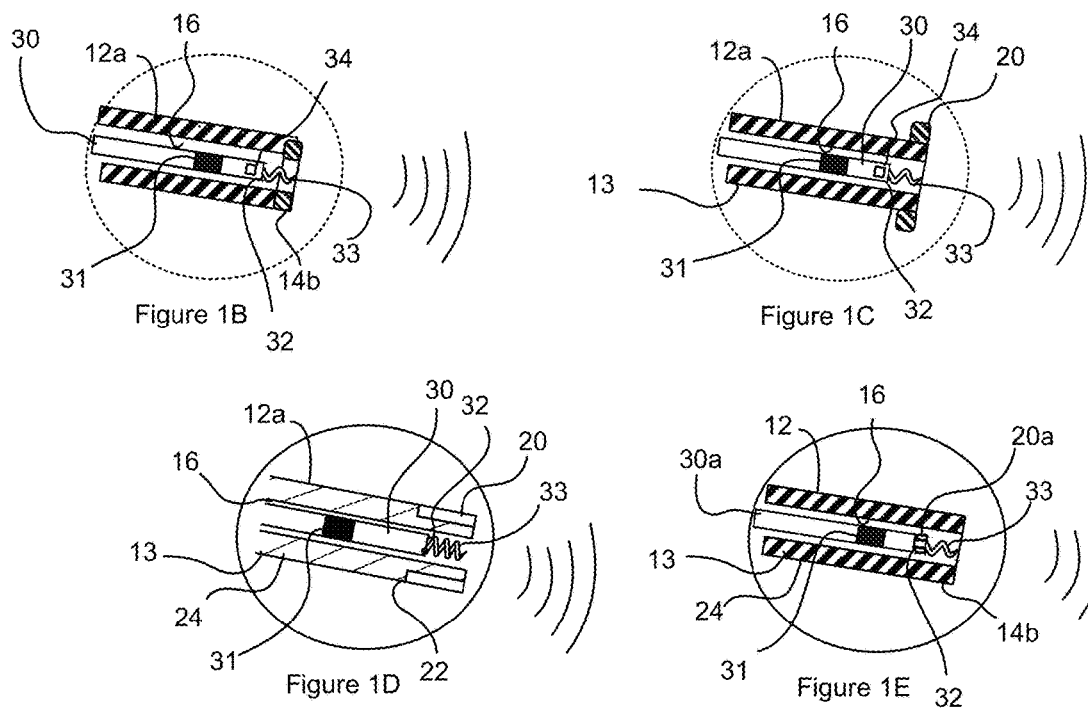

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION OF THE INVENTION

The present invention, as illustrated in example FIGS. 1-7D, discloses and describes a guiding catheter or sheath-cardiac pacing device system or kit 10 that is generally used during a surgical procedure to implant a cardiac pacing device such as a pacemaker and pacing lead or leadless pacemaker. While the invention can be used in various surgical procedures, cardiac pacing device placement surgery will be described in detail to illustrate the present invention. Additionally, while the following description focuses on implantation of cardiac pacing leads, the described cardiac pacing lead can be replaced with a leadless pacemaker. Further, the present invention also contemplates using the various components of the system or kit (e.g., ultrasound guide catheter, sheath, pacing lead, and leadless pacemaker) alone, combined, and in various configurations.

The system or kit 10 of the present invention comprises novel ultrasound guide catheters or pacing leads having one or more transducers 20 (e.g., ultrasound transducers) to aid in performing cardiac lead placement surgical procedures. The guiding catheters and pacing leads of the system or kit 10 comprise non-imaging guiding catheters 12, ultrasound guiding catheters 12a, and implants. The implants include but are not limited to pacemaker or pacing leads 30 and ultrasound equipped pacemaker leads 30a. The ultrasound guiding catheters 12a and the ultrasound equipped pacemaker leads 30a can have one or more ultrasound transducers 20, and 20a, respectively. The ultrasound guiding catheters may contain an intracardiac ECG electrode located at the distal tip of the catheter. The system or 10 is configured to enable medical staff to select between various system or kit 10 configurations for different procedures. The following description provides example embodiments of the system or kit 10 and its various configurations.

FIGS. 1-1D illustrate example ultrasound guiding catheter 12a configurations of the system 10. The ultrasound guiding catheter 12a configurations include a catheter body 13 having at least one ultrasound transducer 20 that is used to accurately place an implant such as a standard cardiac pacemaker lead 30. As will be discussed in more detail below, the ultrasound transducer 20 is generally arranged to image in a forward coaxial orientation in order to provide a forward image as a Cardiologist advances the ultrasound guiding catheter 12a.

The system 10, regardless of configuration, generally includes a pre-deployment configuration, wherein the cardiac pacemaker lead 30 is stored in a lumen extending through the catheter body 13 and a deployed configuration, wherein cardiac pacemaker lead 30 is advanced out of the catheter body 13 for being implanted in a patient.

Continuing with FIGS. 1-1D, the catheter body 13 of the ultrasound guiding catheter 12a comprises a proximal end 14a (see FIG. 1) that is operatively coupled to a hub, a distal end 14b (see FIGS. 1A and 1B) that supports an ultrasound transducer 20, and an axial lumen 16 extending through the catheter body 13 of the ultrasound guiding catheter 12a. The catheter body 13 of the ultrasound guiding catheter 12a includes at least one opening 18 (see FIG. 1A) at its leading or distal end 14b that provides access to the lumen 16 and for storage or deployment of the cardiac pacemaker lead 30.

The catheter body 13 of the ultrasound guiding catheter 12a may take a number of shapes or configurations to optimize the placement of the tip or distal end 14b of the ultrasound guiding catheter 12a near the basal interventricular septum. The ultrasound guiding catheter 12a, may also contain a mechanism (e.g., pull wire) for the distal end 14b to be steered to a desired anatomical location. Further, the ultrasound guiding catheter 12a may also comprise more than one lumen 16 and opening 18, with the lumens 16 and/or openings 18 being at least partially separated by one or more inner walls or partitions. The multiple lumens 16 and openings 18 provide for storage and deployment of various tools and implants.

As briefly mentioned above, the distal end 14b of the catheter body 13 is configured to support one or more ultrasound transducers 20. The ultrasound transducer 20 is configured for at least coaxial imaging. The ultrasound transducer 20 may comprise an annular configuration coupled to at least a portion of the catheter body 13 of the ultrasound guiding catheter 12a. While described as having a partial or complete annular shape, it should be noted that the ultrasound transducer 20 may have any shape and the example(s) disclosed herein should not be considered limiting.

In one example embodiment, as illustrated in FIGS. 1A and 1B, the ultrasound transducer 20 is coupled to the distal end 14b and coaxially aligned with the lumen 16 of the catheter body 13. In this configuration, the ultrasound guiding catheter 12a and ultrasound transducer 20 are configured generally isodiametric without projections. Additionally, the cardiac pacemaker or pacing lead 30 is able to be deployed through an opening 18 extending through the annular ultrasound transducer 20. Once the cardiac pacemaker lead 30 is implanted the ultrasound guiding catheter 12a and ultrasound transducer 20 are removed. As illustrated in FIG. 1B, an ultrasound reflecting marker 34 can be coupled to the pacemaker lead 30 that can be detected by the ultrasound transducer 20 to aid in obtaining the location of the pacemaker lead within the septum A.

In another example embodiment, as illustrated in FIG. 1C, the ultrasound transducer 20 is coupled to and extends about an outer surface of the catheter body 13 of the ultrasound guiding catheter 12a. In this configuration, the ultrasound transducer 20 is positioned further away from a cardiac pacemaker lead 30 upon deployment. The distance aids in reducing ultrasound image artifacts that may appear because of the ultrasound waves producing reflections from the cardiac pacemaker lead 30 or the anchor member 33.

As illustrated in the example embodiment of FIG. 1D, the ultrasound transducer 20 is recessed in a channel or groove (not shown) formed in and extending about an outer surface 24 of the catheter body 13. In yet another example embodiment, the ultrasound guiding catheter 12a includes a reduced section or portion proximate its distal end 14b, whereby a shoulder 22 is formed as it transitions toward the reduced section. The ultrasound transducer 20 extends about the reduced section and rests upon the shoulder. In this configuration, ultrasound transducer 20 is able to emit unimpeded ultrasound waves.

The ultrasound transducers 20 of the various configurations generally comprise one or more send-receive crystal or crystals. The send-receive crystals are positioned in or proximate to the distal end 14b of the catheter body 13. The send-receive crystals can be as simple as a single crystal recording an M mode tracing. A multi-crystal array can also be used in a phased array that can display a two-dimensional or three-dimensional image of the interventricular septum, which may be useful for the additional spatial information that would be provided.

The ultrasound pacing lead 30a of the present invention is constructed of one or more conductive wires or coils insulated by a non-conductive sheath. One or more ultrasound transducers 20a are coupled to or disposed on the pacemaker lead 30. The ultrasound pacing lead 30a can be used with a standard non-imaging guide catheter 12, the ultrasound guide catheter 12a, ultrasound reflector, or ultrasound transmitting crystal in a pacemaker lead. Like the pacemaker leads 30 discussed above, the ultrasound pacing leads 30a are movable, slidable, or retractable within the lumen 16 of the catheter body 13 of the guide catheter 12 or 12a.

The ultrasound pacing lead 30a can take any configuration. As with conventional pacemaker leads 30, the ultrasound pacing lead 30a comprises an anode ring 31 that is operatively coupled with a cathode portion 33 of the ultrasound pacing lead 30a. The ultrasound pacing lead 30a can also comprise a screw or attachment end 32 having an anchor member 33 fixed or retractable mounted thereon.

The anchor member 33 is configured to permit attachment to tissue at or proximate to the tissue to be treated. In one example embodiment, the anchor member 33 comprises a helical configuration having a pointed end. Other anchor member 33 configurations are also contemplated herein and may include barbs, hooks, toggles, and the like.

All of the pacemaker leads 30 and 30a of the present invention are generally positionable between a pre-deployed configuration (see standard non-imaging pacemaker lead position of FIG. 1) where the pacemaker leads 30 and 30a are contained within the lumen 16 of a catheter body 13, and a post-deployed configuration (see standard non-imaging pacemaker lead position of FIG. 5A) where the pacemaker leads 30 and 30a are moved out of the lumen 16 of the catheter body 13, and into a portion of the patient's anatomy.

As particularly illustrated in FIG. 1E, the ultrasound transducer 20a is coupled at or near the tip, free end, or attachment end 32 of the ultrasound equipped pacemaker lead 30a. Placing an ultrasound transducer 20a on or proximate to the free end or attachment end 32 of the ultrasound equipped pacemaker lead 30a allows for measuring the distance to an anatomical target such as the left ventricular endocardium. Placement of the ultrasound transducer 20a in this manner allows for a more accurate measurement as it is measuring directly from or proximate to the tip, free end, or attachment end 32 of the ultrasound equipped pacemaker lead 30a.

Figure 3A:
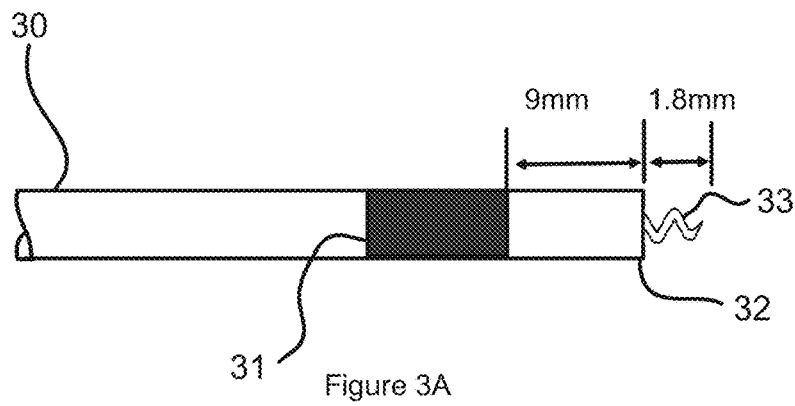
FIG. 3A is a view of a Medtronic 3830 fixed screw pacemaker lead with dimensions of the helix length and tip to anode ring distance as would be imaged fluoroscopically.
Figure 3B:
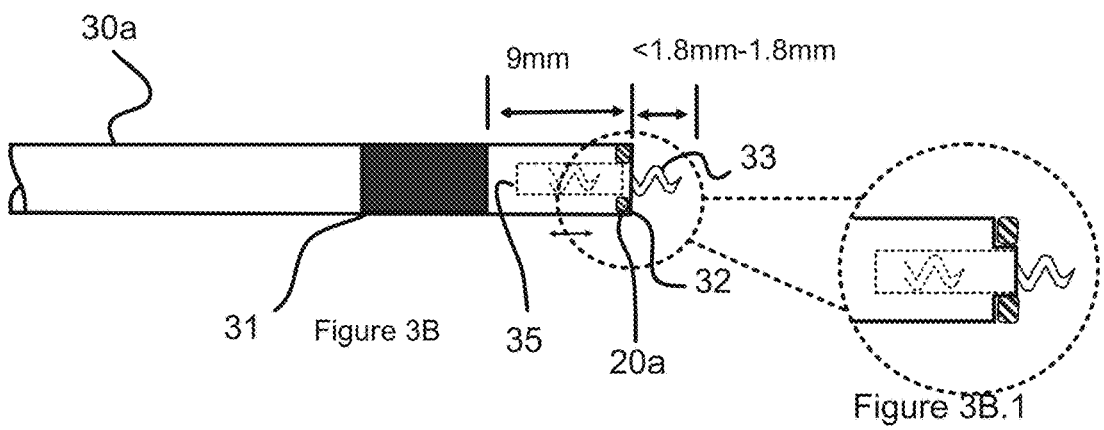
FIG. 3B is an illustration of a pacemaker lead with an annular transducer at its tip and a retractable screw.
Figure 3C:
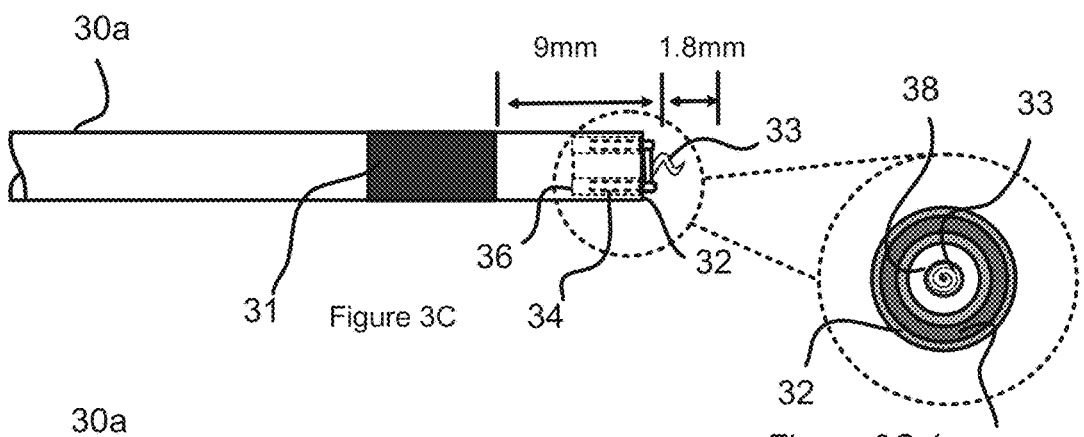
FIG. 3C is a view of a pacemaker lead with an inset annular ultrasound crystal to provide a visible ultrasound signal of the location of the lead tip.
Figure 3D:
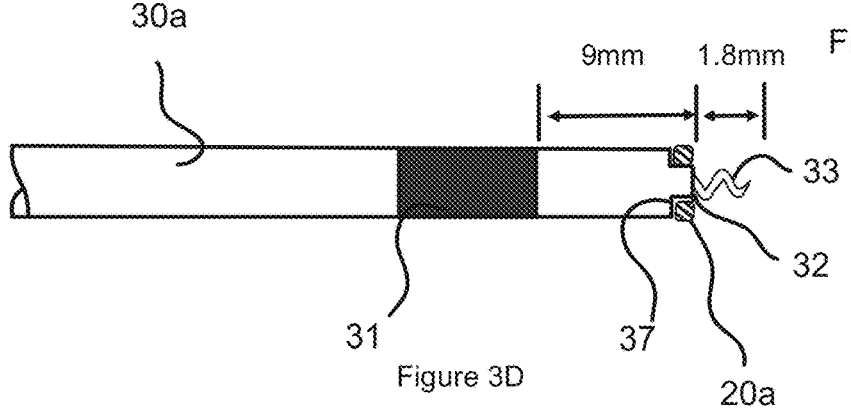
FIG. 3D illustrates a pacemaker lead with an annular ultrasound transducer at its tip.

Turning to FIGS. 3B through 3D, example embodiments of the ultrasound equipped pacemaker leads 30a of the present invention are illustrated. For reference, FIG. 3A illustrates a standard pacemaker lead 30 having a ring electrode 31. As mentioned above, FIG. 3C illustrates a pacemaker lead 30a having a marker 34 that can be used during imaging to echocardiographically identify the location of the pacemaker lead end or tip 32. The marker 34 comprises an ultrasound reflective material that is readily detected by the imaging technology, or an active ultrasound crystal emitting signals easily detectable by the imaging transducer on a guide catheter or sheath. The standard pacemaker lead 30 can be used in the system 10 configurations employing the ultrasound guiding catheter 12a. The standard pacemaker lead 30 may also include an anchor member 33 that can have any configuration, as described above.

The ultrasound equipped pacemaker lead 30a, illustrated in FIG. 3B, comprises an ultrasound transducer 20a (see FIG. 3B.1) coupled to its screw or attachment end 32. An anchor member 33 is mounted on the attachment end 32 to anchor the ultrasound equipped pacemaker lead 30a to the tissue. In this example embodiment, the ultrasound equipped pacemaker lead 30a provides a cardiologist with an ultrasound image as the ultrasound equipped pacemaker lead 30a is advanced rather than relying upon other techniques such as fluoroscopy and electrical measurements to approximate its position.

The present invention also comprises a movable or retractable anchor member 33. The anchor member 33 can be moved between a retracted position (illustrated in phantom lines of FIG. 3B) and an extended position, as illustrated in FIGS. 3A, 3C, and 3D. In the retracted position, the anchor member 33 is positioned inside a bore or channel 35 formed in the attachment end 32 of the ultrasound equipped pacemaker lead 30a. The anchor member 33 can be moved into the retracted position to provide a clear ultrasound image or reading without artifacts that may be created when the anchor member 33 is in the extended position. The anchor member 33 may also comprise a material or configuration that does not interfere with the ultrasound imaging.

The ultrasound equipped pacemaker lead 30a embodiment of FIG. 3C includes an ultrasound transducer 20a (incorporated into the attachment end 32 of the ultrasound equipped pacemaker lead 30a to provide an alternative to using an ultrasound catheter 12a (discussed below). The ultrasound transducer 20a of this embodiment is be mounted or set into a bore 36 extending into the attachment end 32.

In one example embodiment, the bore 36 comprises an annular bore 36 that is formed in the attachment end 32 to house an annular ultrasound crystal for the purpose of location. As illustrated in FIG. 3C.1, a central post 38 extends axially through the annular bore 36 to support the anchor member 33. The central post 38 can have an internal chamber configured to accommodate a retractable anchor member 33.

The annular ultrasound transducer 20a may be flush with an end of the ultrasound equipped pacemaker lead 30a or it may extend a distance beyond the end of the ultrasound equipped pacemaker lead 30a. While the ultrasound transducer 20a is shown having an annular shape, one skilled in the art will appreciate that any shape and configuration may be used. For example, individual ultrasound transducers 20a may be spaced around the central post 38.

FIG. 3D illustrates another example embodiment of the ultrasound equipped pacemaker lead 30a of the present invention. The ultrasound transducer 20a of this embodiment comprises an annular shape set into a notch 37 formed at the free or attachment end 32 of the ultrasound equipped pacemaker lead 30a. The annular ultrasound transducer 20a can also be fixed, fused, or adhered to the attachment end 32, whereby it extends at least partially about the anchor member 33. To limit interference of the ultrasound imaging by the anchor member 33, the present invention employs an anchor member 33 having a wave deflecting shape or configuration. Additionally, the system 10 of the present invention can replace an imaging artifact, caused by an anchor member 33, with previously captured images. The system can scale the replaced images to provide an accurate image.

FIGS. 4A through 4H illustrate a number of ultrasound guidance system 10 configurations of the present invention. The ultrasound guidance system 10 configurations are provided as examples only and should not be considered limiting. Other ultrasound guidance system 10 configurations falling within the spirit and scope of those illustrated are also contemplated herein.

Figure 4A:
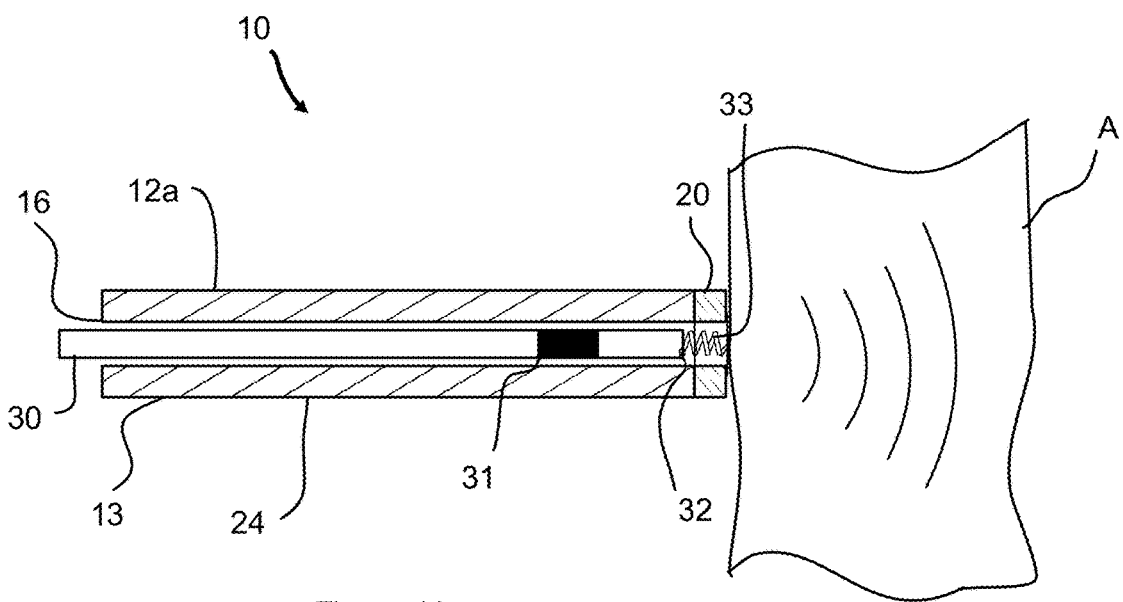
FIG. 4A is a cross section view of an ultrasound guiding catheter having a standard screw in pacemaker lead in its lumen. The ultrasound guiding catheter is used to take measurements.
Figure 4B:
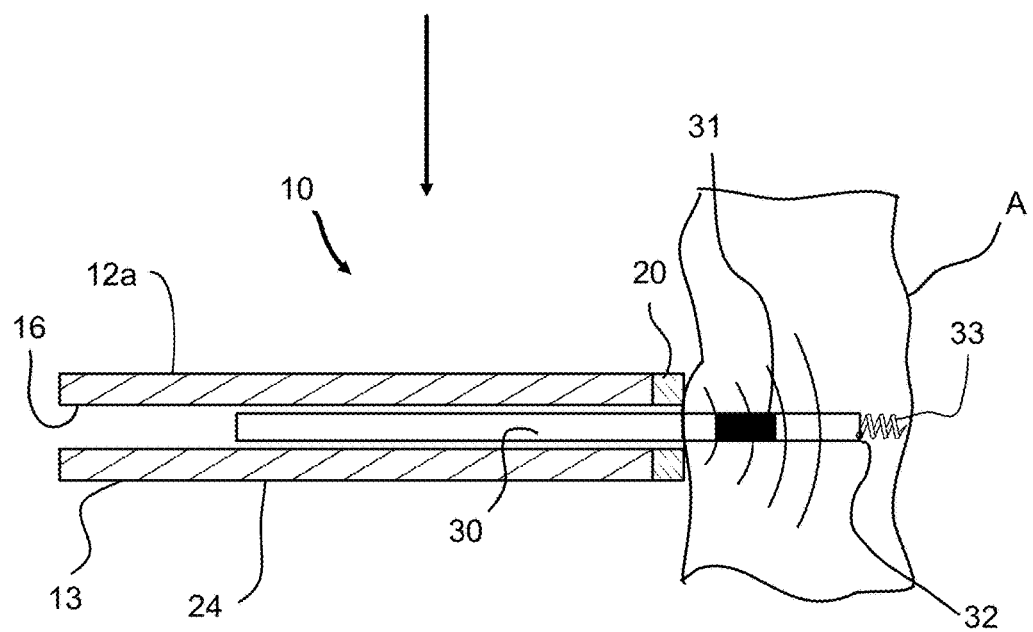
FIG. 4B is a cross section view the ultrasound guiding catheter of FIG. 4A with the screw-in pacemaker lead deployed to its desired position. The ultrasound guiding catheter is removed after implantation of the screw-in pacemaker lead.

Turning to FIG. 4A, the ultrasound guiding system 10 comprises a separate ultrasound guiding catheter 12a having a transducer 20 mounted on its end to capture measurements recording of the thickness and/or configuration of the interventricular septum. A standard non-imaging pacemaker lead 30 is stowed in the lumen 16 of the ultrasound guiding catheter 12a. Once the measurements and configuration of the interventricular septum has been determined the standard pacemaker lead 30 is the implanted as shown in FIG. 4B. The ultrasound guiding catheter 12a is then removed.

Turning to FIG. 4C, the ultrasound guiding system 10 comprises a separate non-imaging guide catheter 12 and a combined catheter body 13 and ultrasound transducer 20. In this embodiment, a standard non-imaging guide catheter 12 is used, but the pacemaker lead 30 is temporarily replaced with an ultrasound equipped catheter body 13 having the ultrasound transducer 20 at its tip. The ultrasound equipped catheter body 13 is used to make a recording of the thickness and/or configuration of the interventricular septum, and then exchanged for the pacemaker lead 30, which is then placed (see FIG. 4D) with knowledge of the interventricular wall thickness.

Figure 4E:
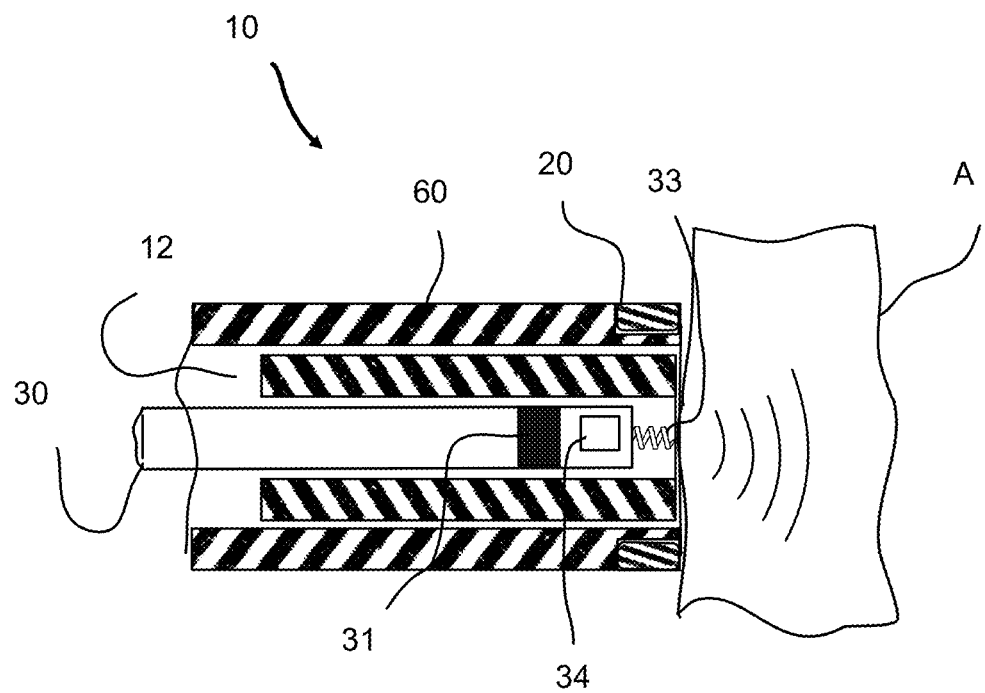
FIG. 4E is a cross section view a coaxial ultrasound sheath having a standard non-imaging guide catheter in its lumen. A screw-in pacemaker lead having a marker is in the lumen of the standard non-imaging guide catheter.

As illustrated in FIG. 4E, another embodiment of the ultrasound guiding system 10 comprises an ultrasound equipped coaxial sheath 60 having an ultrasound transducer 20 at its tip, which may be placed external to the guide catheter 12 and advanced to a position at or near the right side of the interventricular septum A for imaging of the septum A. The pacemaker lead 30 may then be inserted into a non-imaging guide catheter 12 for placement in the septum A (see FIG. 4F).

Figure 4F:
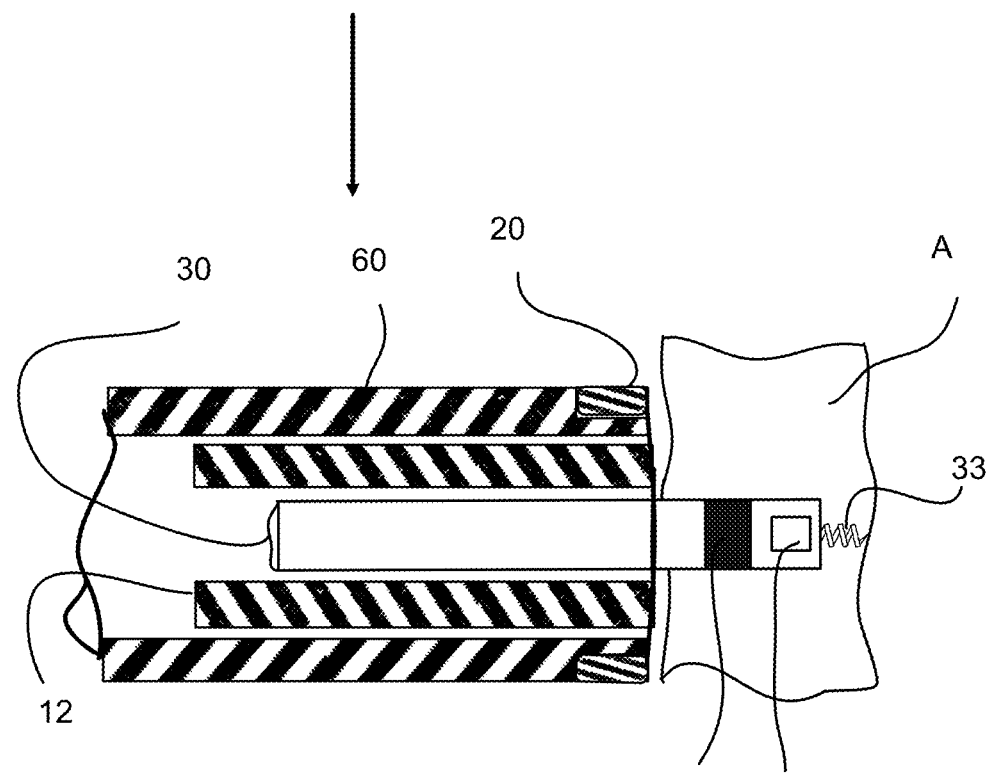
FIG. 4F is a cross section view of the screw-in pacemaker lead of FIG. 4E implanted in the septum. The ultrasound sheath and standard non-imaging catheter are removed after implantation of the screw in pacemaker lead.

Continuing with FIGS. 4E and 4F, a passive ultrasound reflector or an active ultrasound crystal 34 may be placed or positioned on the pacemaker lead 30, to assist in visualizing the location of the pacemaker lead 30 relative to the left ventricular endocardium on ultrasound imaging. The active ultrasound crystal 34, vibrating at a frequency detectable by the guide catheter 60 echocardiogram, can also assist in locating the tip of the pacemaker lead 30.

Figure 4G:
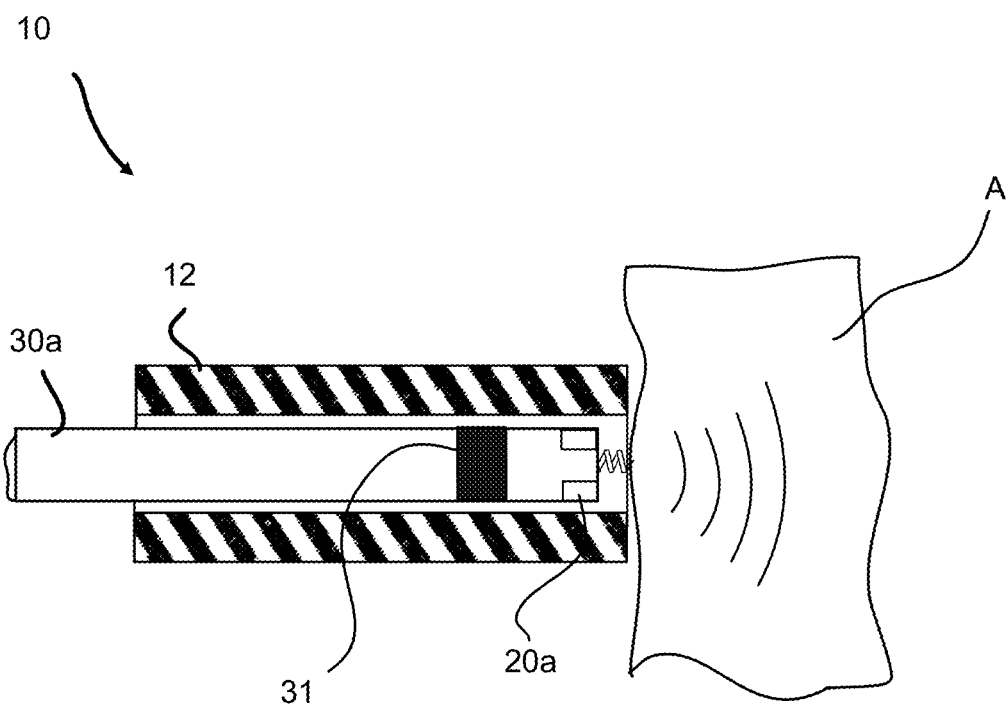
FIG. 4G is a cross section view of a standard non-imaging guide catheter. In its lumen is a screw-in pacemaker lead with an ultrasound transducer at or near its tip for purposes of obtaining coaxially directed forward images.
Figure 4H:
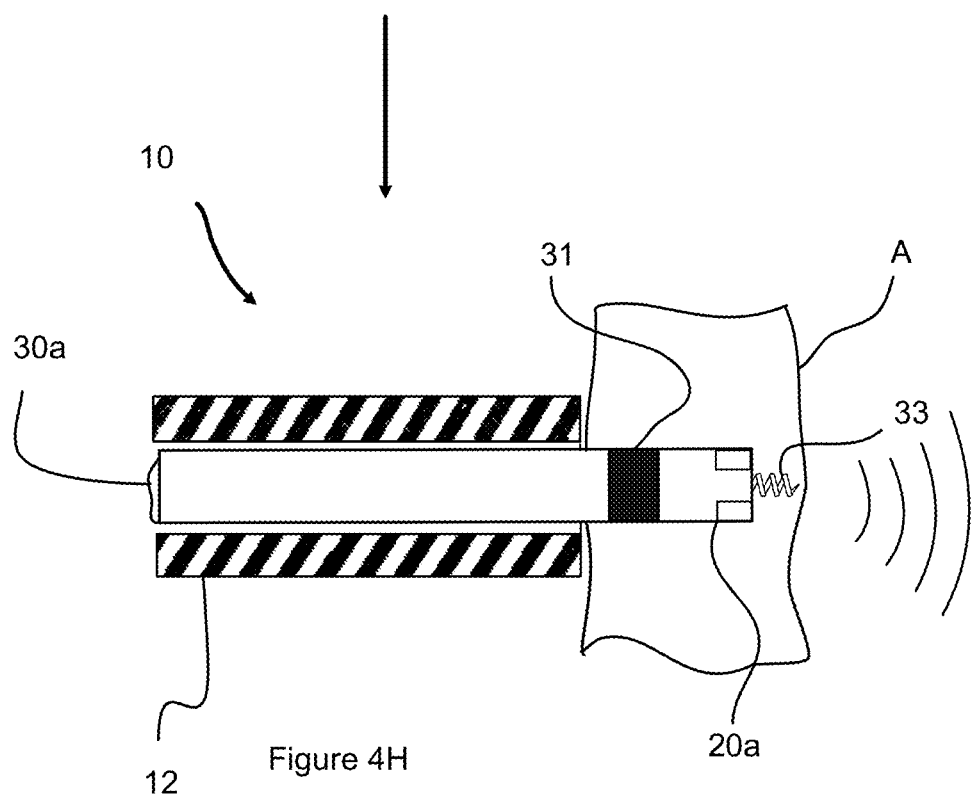
FIG. 4H is the cross section view of the standard non-imaging guide catheter of FIG. 4G with the screw-in pacemaker lead implanted in the septum. The standard non-imaging catheter is removed after implantation of the screw in pacemaker lead.

As illustrated in the embodiment of FIGS. 4G and 4H, an ultrasound transducer 20a is built into the ultrasound equipped pacemaker lead 30a tip within the lead 30a as shown, or as an annular transducer 20a at the lead 30a tip. The ultrasound equipped pacemaker lead 30a can be stowed in a lumen 16 of a standard non-imaging guide catheter 12 as illustrated in FIG. 4G. After the ultrasound equipped pacemaker lead 30a is implanted into the septum A, as illustrated in FIG. 4H, the standard guide catheter 12 can be removed.

The ultrasound transducers 20 and 20a may comprise any ultrasound transducer configurations now known or developed in the future. While any ultrasound frequency needed for a particular procedure may be employed, the present invention uses a frequency generally between 2.0 Mhz and 40 Mhz to capture anatomical and positioning images during a surgical procedure.

Figure 2A:
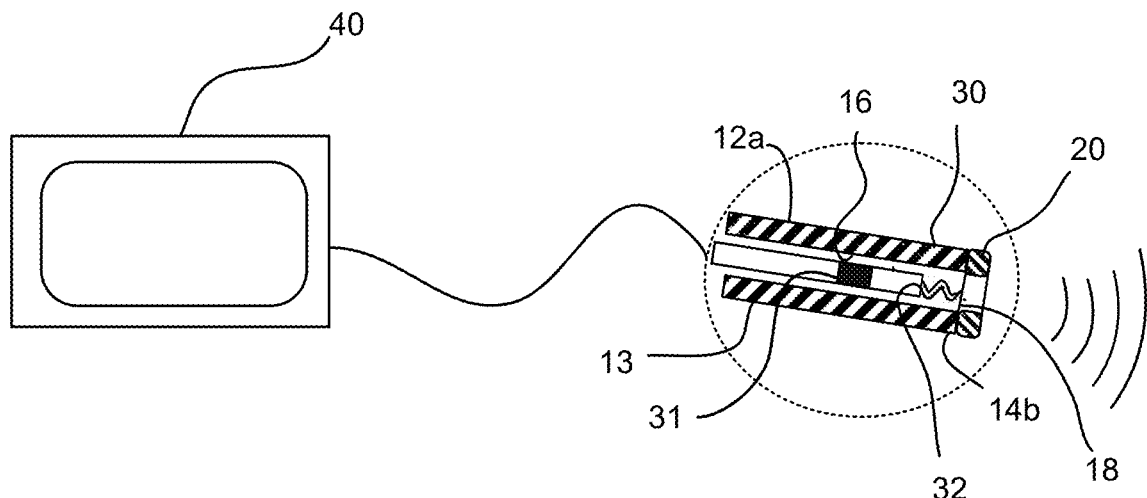
FIG. 2A is a plan view of a display coupled to the ultrasound guiding system according to an example embodiment of the invention.

As illustrated in FIG. 2A, the present invention also comprises a display 40 operatively coupled to or in wireless communication with the ultrasound transducer 20 or 20a of the system 10. The display 40 is configured to display an image sent by the ultrasound transducer 20 or 20a, which may comprise a typical M mode, two-dimensional, or three-dimensional display. The display 40 may comprise a monitor, phone, tablet, or any other display capable of receiving and displaying an image.

In use, a Cardiologist makes an incision and creates a surgical pocket under the skin. A needle is used within the pocket to puncture the subclavian vein. A guidewire is threaded through the needle and a dilator/sheath combination are used to allow insertion of the guide catheter 12 or 12a into the subclavian vein. Alternately, a cutdown may be made on the cephalic vein to access the subclavian vein. The guide catheter 12 or 12a is then placed in the central circulation.

Figure 5A:
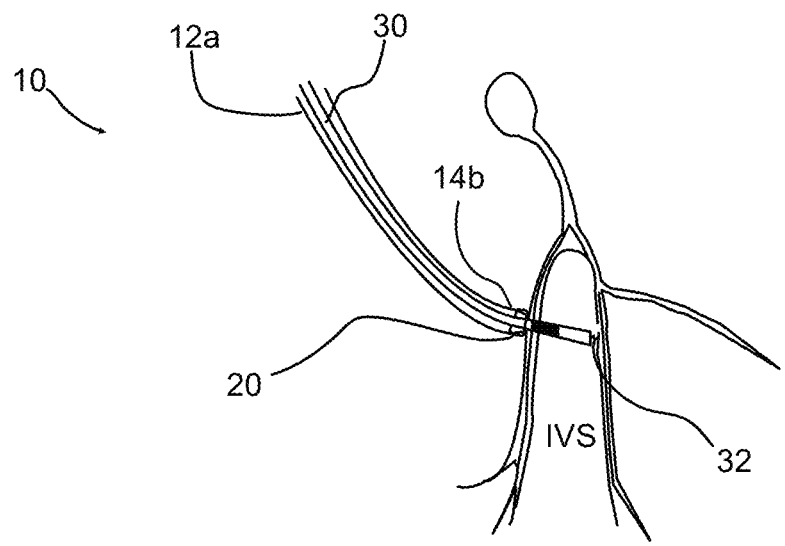
FIG. 5A is a perspective view of the ultrasound guiding system in a post-deployment configuration according to an example embodiment.
Figure 5B:
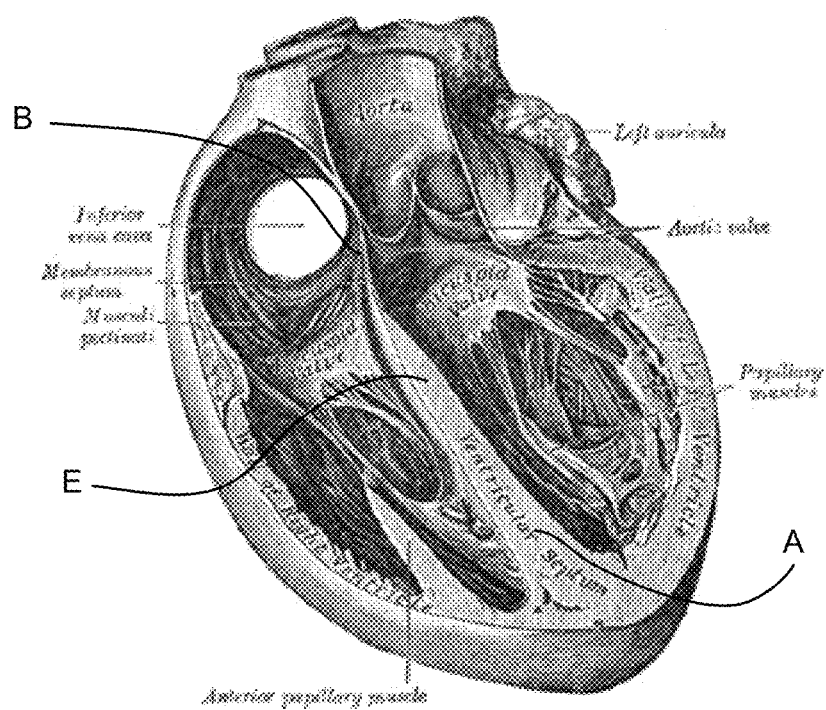
FIG. 5B is a cross section of the heart depicting the structure of the membranous and muscular portions of the interventricular septum.

Once the guide catheter 12 or 12a is inserted, the pacemaker lead 30 or 30a is inserted or threaded into the guide body 12. The catheter body of guide catheter 12 or 12a may be pre-shaped and/or steerable, and with manipulation under fluoroscopy, it may be initially placed in a spot or location adjacent to the membranous septum which is depicted in FIGS. 2B and 5A.

Figure 2B:
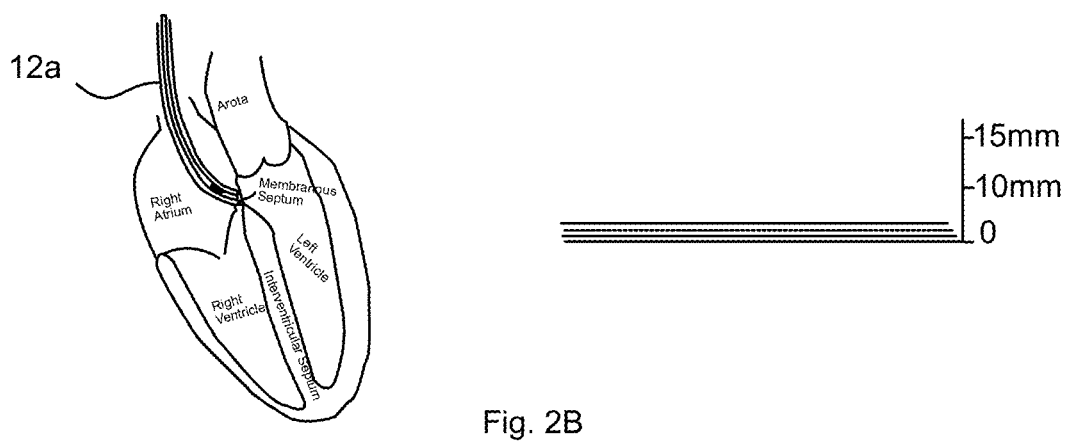
FIG. 2B is an illustration of the imaging guide catheter adjacent to the membranous septum with the resulting M mode echo recording showing the thin membranous septum with no systolic thickening.
Figure 2C:
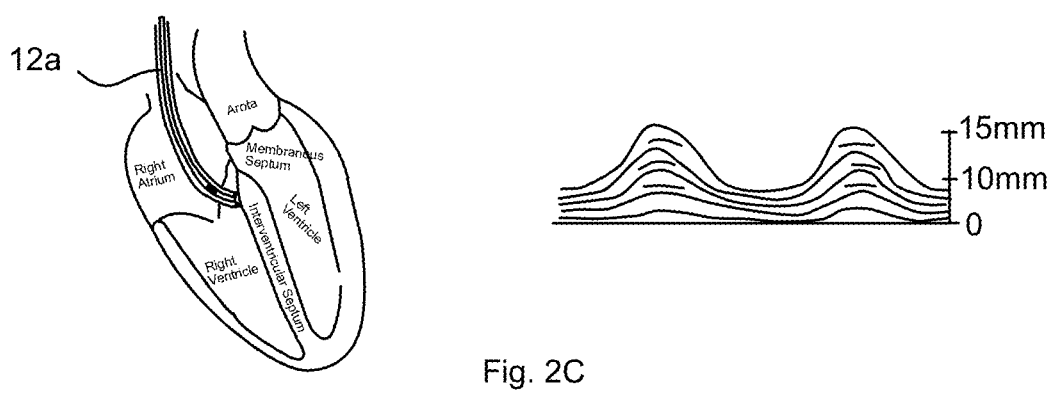
FIG. 2C is an illustration of the imaging guide catheter adjacent to the muscular septum with the resulting M mode echo recording of the thick muscular septum demonstrating muscular thickening in systole.

As illustrated in FIGS. 2B and 2C, using ultrasound transducer 20 to image the thin membranous septum B and the thicker interventricular septum A allows precise anatomic positioning of the ultrasound guide catheter 12a to an ideal location, rather than relying on the surrogate of electrical measurement of the Bundle of His electrogram, which is often difficult and time consuming to obtain. The anatomy of the membranous and muscular interventricular septum is particularly appreciated when viewing FIG. 5A, a cross section of the heart, which shows in great detail the structures of the interventricular septum A and B. The thin membranous septum B, which contains the Bundle of His, is attached to the muscular septum A, which typically measures 8-12 mm thickness in the normal heart. As shown in FIGS. 2A and 2B, an ultrasound guiding catheter 12a can easily distinguish the thin membranous septum B from the thicker muscular septum A for accurate anatomic placement of a left bundle area pacemaker lead 30. Alternatively, ultrasound equipped pacemaker lead 30a having ultrasound transducer 20a can be used to image or visualize the structures of the interventricular septum A and B.

The ultrasound crystal(s) of the ultrasound transducer 20 or 20a transmits a pulsatile signal into the interventricular septal myocardium and reflected sound waves are used to construct an image of the adjacent heart structures.

The membranous septum B may be identified echocardiographically as a thin non-contractile structure as seen in FIG. 2B. The fluoroscopic image of this location is saved as a reference and then the guide body 13 of the ultrasound guiding catheter 12a/standard pacemaker lead 30 configuration, or the guiding catheter 12/ultrasound equipped pacemaker lead 30a configuration, is advanced distally as shown in the FIG. 2C to a point 1-2 cm toward the right ventricular apex, which is the location of the proximal bundle branches.

Figure 5C:
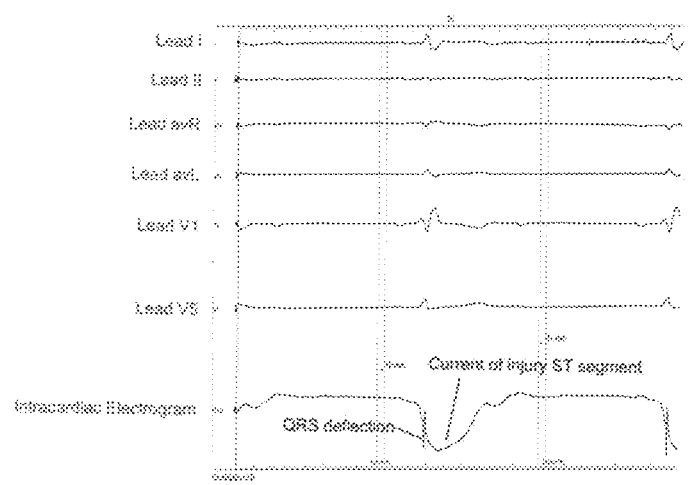
FIG. 5C is an illustration of an ECG readout including an intracardiac electrogram depicting the current of injury ST segment depression, indicating contact of the tip electrode with the septal myocardium.

Additional information about the position of the pacemaker lead 30 in the heart may be obtained from detecting the so called "current of injury" that results when the pacemaker electrodes 33 within the guide catheter 12a makes contact with the interventricular myocardium. The current of injury shown in FIG. 5C is a marked ECG ST segment deflection that is seen when heart muscle is contacted by the helical tip electrode. FIG. 5C depicts a recording of the surface ECG and an intracardiac electrogram showing the current of injury that is seen when an intracardiac electrode is in contact with ventricular muscle.

The typical His bundle electrogram is recorded with a high pass electrical filter set at 300 Hz. At this setting the current of injury is filtered out and is not visible, but with the high pass filter adjusted in a range of approximately 5 Hz, 0.5 Hz, or more precisely at 0.05 Hz (as is used in the standard 12 lead ECG), the current of injury is very easily seen. As the guide catheter 12a with the pacemaker lead tip 32 positioned at the opening 14b is advanced from the right atrium across the tricuspid valve, the ECG QRS abruptly becomes much larger as it enters the right ventricle, and the ST segment current of injury becomes apparent when the helical electrode 33 contacts ventricular muscle, indicating the proximal portion of the interventricular septum has been reached.

Figure 4I:
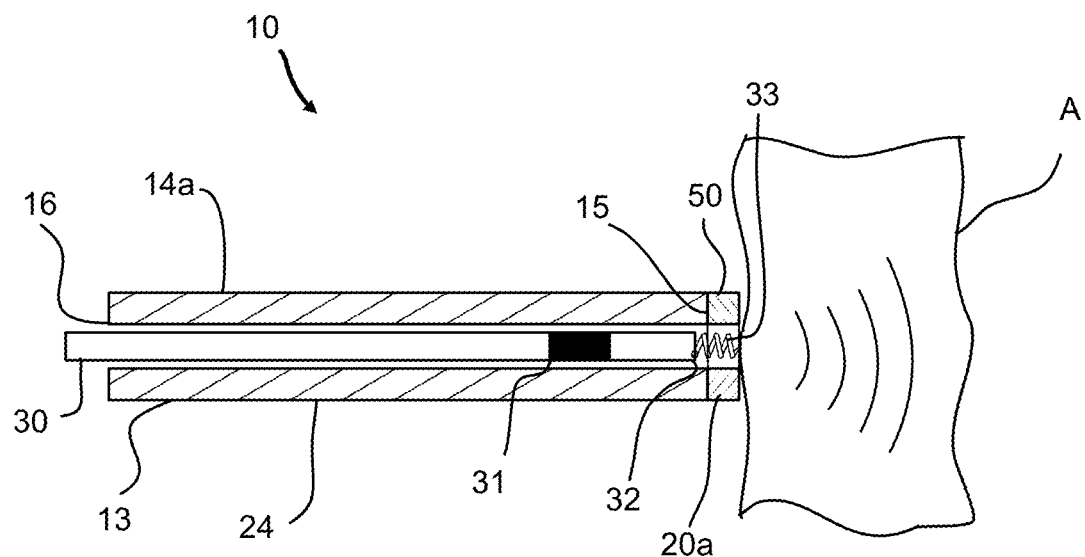
FIG. 4I is the cross section view of the standard non-imaging guide catheter having an ECG electrode mounted thereon and positioned in the right ventricle against IVS for the purpose of detecting a position of the pacemaker leader prior to implantation.
Figure 4J:
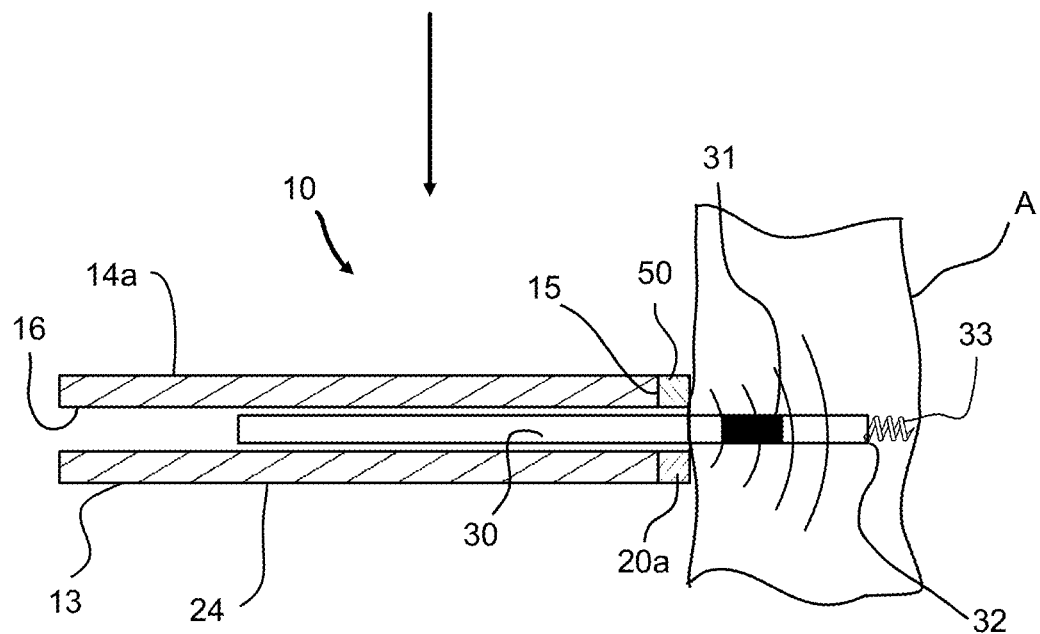
FIG. 4J the cross section view of the standard non-imaging guide catheter having an ECG electrode mounted thereon and positioned in the right ventricle against IVS with the pacemaker lead implanted adjacent to the left bundle.

As illustrated in FIGS. 4I-4J, a modification of the guide catheter 14a, in which an ECG electrode 50 is placed at the tip 15 of the guide catheter 14a, so that the electrocardiogram to detect the current of injury may is recorded from the guide catheter 14a. This is an alternative to recording the ECG from the tip electrode 33 of the pacemaker lead 30, because it is often uncertain whether the electrode tip 33 of the pacemaker lead 30 is positioned exactly at the tip 15 of the guide catheter 14a, whether it is still within the guide catheter 14a and proximal to the tip 15, or whether it extends beyond the tip 15 of the guide catheter 14a. In another example embodiment, the guide catheter 14a includes both an ECG electrode 50 and an ultrasound transducer 20a.

When the guide body 13 of the ultrasound guiding catheter 12a/standard pacemaker lead 30 configuration, or the guiding catheter 12/ultrasound equipped pacemaker lead 30a configuration, is advanced to a desired anatomical location or site, the cardiologist is able to echocardiographically identify the interventricular septum as a contractile 8-12 mm thick structure which thickens in systole as shown in FIG. 2C. The ultrasonic display (40) image of the septum allows exact measurement of the distance to the left side of the interventricular septum at the left ventricular endocardium and left bundle.

It is important for the pacemaker lead to enter the interventricular septum at an angle that is perpendicular to the wall. Rotating the guide catheter 12 or 12a by the hub to obtain the minimum echocardiographic thickness of the wall serves to assure the operator that the guide catheter 12 or 12a is pointed at an axis perpendicular to the wall of the interventricular septum.

The anatomic approach to placement of the pacemaker lead 30 or ultrasound equipped pacemaker lead 30a obviates the often difficult and time consuming step of locating the bundle of His using electrical measurements. It also quickly identifies the basal muscular interventricular septum as the appropriate spot and at the correct angle to begin screwing the lead toward the left ventricular endocardium.

The importance of the ultrasound guided anatomic approach taught herein is that the sophisticated and expensive equipment used in an electrophysiology laboratory for detecting the bundle of His electrical potentials is no longer needed. Currently, left bundle area pacing leads may only be implanted in such fully equipped electrophysiology laboratories. Standard pacemakers with right ventricular pacemaker leads may be implanted in a variety of settings in a cardiac catheterization laboratory or an operating room with fluoroscopy. The present invention eliminates the constraint of needing to use an electrophysiology laboratory to detect the His bundle electrogram for implantation of left bundle area pacemaker leads.

Once the septal thickness measurement is obtained and the proximal muscular intraventricular septum A is located via ultrasound, the pacemaker lead 30 or ultrasound guiding pacemaker lead 30a or ultrasound equipped pacemaker lead 30a is rotated and screwed into the tissue. The screw or anchor member 33 and the pacing lead 30 or ultrasound equipped pacemaker lead 30a continue to be rotated into and advanced through the interventricular septum A until the tip of the pacing lead 30 or ultrasound equipped pacemaker lead 30a is subendocardial on the left side of the septum A using measurements obtained from the ultrasound transducer 20 or 20a and the penetration depth measurement on the pacemaker lead and guide catheter hub as described in detail below.

In another example embodiment, contrast dye injection through the ultrasound guide catheter 12a may also be used to visualize the right side of the septum A to judge the distance that the pacemaker lead 30 has penetrated into the septum A. Alternately, the location of the tip 32 of the pacemaker lead 30 may be echocardiographically visualized directly relative to the location of the endocardial surface of the left ventricle. Identification of the lead tip 32 may be further aided by visualizing the ultrasound marker 34. Once the correct anatomic location of tip 32 of the pacemaker lead 30 is obtained, electrical measurements described above are made to confirm the appropriate position of the lead 30.

Figure 6:
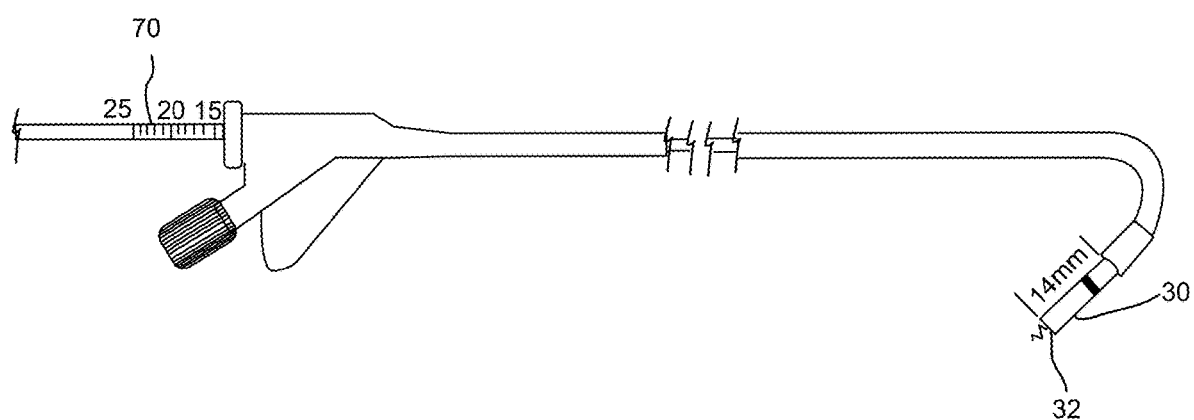
FIG. 6 is a perspective view of a guiding catheter with a screw-in pacemaker lead extending through the guide catheter and out beyond the catheter tip. For the sake of an example, a Medtronic C315 His bundle guide catheter and a modified 3830 screw-in pacemaker lead combination are illustrated. The figure shows markings inscribed on the pacemaker lead body at the level of the guide catheter hub that indicate the distance that the pacemaker lead has extended beyond the guide catheter tip.

A simple and expedient method of precisely placing the tip 32 of the pacemaker lead 30 at a subendocardial location on the left side of the interventricular septum is illustrated in the lead penetration markings 70 of FIG. 6. Once the thickness of the interventricular septum has been accurately measured using one of the ultrasound methods described herein, the pacemaker lead 30 is screwed into the myocardium to a distance judged to be subendocardial as indicated by the indexed penetration markings 70 on the body of the pacemaker lead 30, which corresponds to the distance the lead 30 has extended beyond the tip 15 of the guide catheter 12a.

The zero index mark 72 (see FIG. 7) on the body of the pacemaker lead 30 is inscribed at a point where the tip 32 of the pacemaker lead 30 would be flush with the tip 15 of the guide catheter 12a. Millimeter markings inscribed proximal to the zero index mark 72 indicate the distance that the tip 32 of the pacemaker lead 30 has extended beyond the tip 15 of the guide catheter 12a.

With the tip 15 of the guide catheter 12a against the interventricular septum, the indexed markings 70 on the body of the pacemaker lead 30 will correlate exactly with the depth of lead 30 penetration into the interventricular septum. In FIG. 6, the tip 32 of the pacemaker lead 30 has extended 14 mm and the markings 70 on the body of the pacemaker lead 30 indicate the 14 mm penetration into the interventricular septum.

Figure 7A:
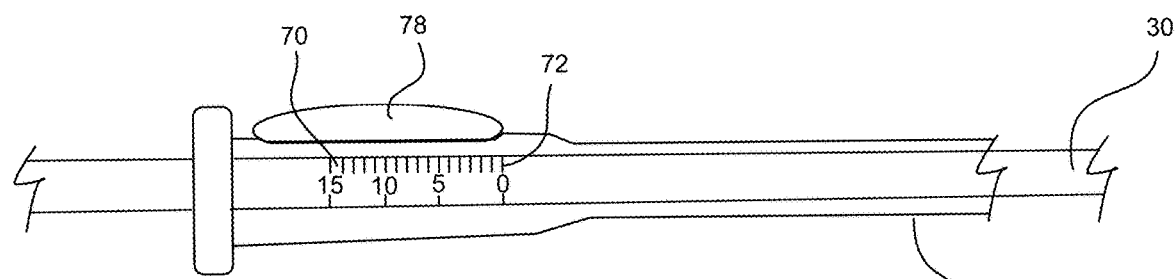
FIG. 7A is a cutaway view of a guide catheter and a pacemaker lead threaded within it. A transparent window and/or magnifying lens in set into the guide catheter hub, that allows easy readability of the distance markings inscribed on the pacemaker lead.
Figure 7B:
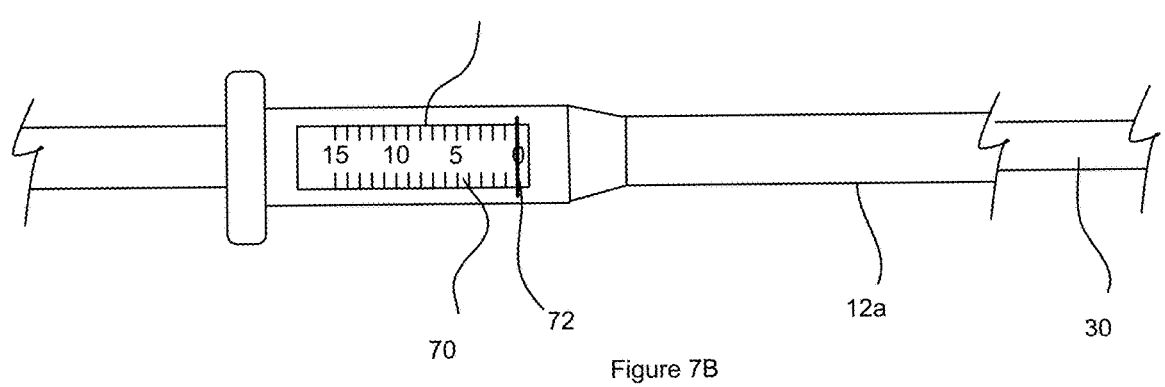
FIG. 7B is a plan view of the guide catheter with a magnifying lens making the markings on the pacemaker lead easily readable. An index line indicates the distance that the pacemaker lead has extended from the tip of the sheath.

An alternate embodiment of the lead penetration gauge 76 is illustrated in FIGS. 7A and 7B. Here the pacemaker lead 30 and guide 12a operate as a complementary system permitting easy visualization of the lead 30 penetration depth as the lead 30 is screwed into the interventricular septum. The penetration may be continuously monitored via the magnifying lens 78, making the pacemaker lead 30 markings 70 more readable, while the operator is able to see the advancement as the lead 30 is rotated, without having to take their fingers off the lead 30 as would be necessary in the embodiment shown in FIG. 6.

Figure 7C:
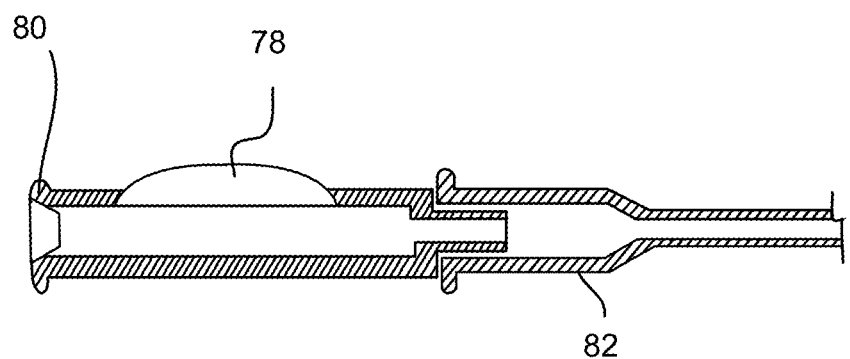
FIG. 7C is a cutaway view of a hub extension containing a magnifying lens, attached to a standard guide catheter.

In the case where an integral magnifying lens 78 is not available in a guide catheter 12a, an additional embodiment of a hub extension 80 shown in FIG. 7C may be used. The hub extension 80 may be attached to a standard guide catheter hub 82. The hub extension 80 contains a magnifying lens 78 similar to that shown in FIG. 7A for purposes of reading the distance markings 70 on a pacemaker lead 30.

Figure 7D:
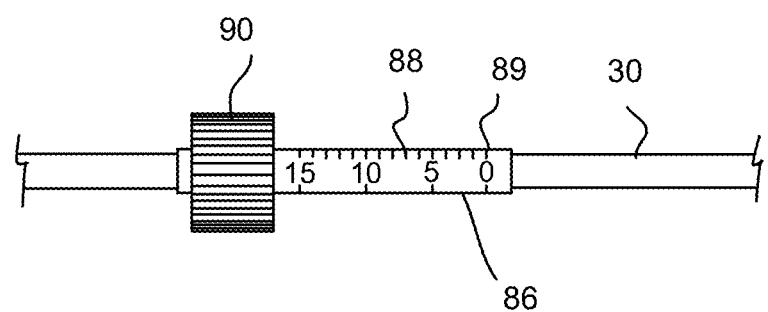
FIG. 7D is a plan view of a pacemaker lead with a concentric sleeve inscribed with distance markings. The sleeve is contiguous with a larger diameter rotation grip portion to permit easy rotation of the pacemaker lead.

In the case of a pacemaker lead 30 that has no distance markings 70, another embodiment may be envisioned as shown in FIG. 7D. A sleeve 86 with distance markings 88 may be placed around the lead 30 and secured in a position where the zero index 89 on the sleeve 86 is aligned with a corresponding index 70 on the guide catheter hub 82 or hub extension 80 or hub extension 80. The two index markers are to be aligned at the point where the tip 32 of the pacemaker lead 30 is flush with the tip 15 of the guide catheter 12a. The sleeve 86 is then secured onto the lead 30 with a suture or other desired mechanism.

As shown in FIG. 7D, the sleeve 86 may have an attached proximal feature 90 that has greater grip and/or a larger diameter, that permits accurate rotation of the pacemaker lead 30 while still allowing visualization of the distance markings 88 during lead 30 rotation. The sleeve 86 is removed after the lead 30 has been placed.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. A pacemaker lead-guide catheter kit with distance, position, and thickness detection capabilities, the kit comprising:
   a. a guide catheter comprising:
      i. a catheter body having an end with an access opening formed therein and a tip having an opening formed therein, the catheter body having a bore extending along a length between the opening of the end and the tip;
      ii. at least one penetration gauge having indicia formed on a portion of the catheter body, the at least one penetration gauge comprising a transparent material;
      iii. a hub extension having indicia on its body with a penetration gauge comprising a transparent material;
      iv. at least one ultrasound transducer disposed proximate to the tip and configured to image coaxially of the ultrasound transducer through the interventricular septum, wherein an image from the ultrasound transducer provides a position of the guide catheter in relation to the intraventricular septum;

b. a pacemaker lead insertable in the bore for delivery to the left sided endocardium of the heart, the pacemaker lead comprising:
   i. an elongated body having at least one end anchorable to cardiac tissue; and
   ii. at least one anchor disposed on the at least one distal end of the pacemaker lead and configured to anchor the at least one distal end of the pacemaker lead proximate in the left sided endocardium of the heart.

2. The kit of claim 1, further comprising at least one marking disposed on a portion of the body of the at least one pacemaker lead that denotes a measurement, the at least one marking being alignable with a portion of catheter body, wherein a distance of travel of the pacemaker lead from the catheter tip is determined by the at least one marking and the guide catheter body.

3. The kit of claim 2, wherein the hub extension is connectable to the end of the catheter body, the hub extension having a penetration gauge with measurement indicia thereon, the penetration gauge comprising a transparent material, wherein a portion of the pacemaker lead is visible through the penetration guide, wherein the at least one marking and indicia of the penetration gauge are used to measure a distance the pacemaker lead extends from the tip of the guide catheter.

4. The kit of claim 1, wherein the at least one anchor comprises a helical configuration and further comprising:
   a. a rotatable sleeve having an outer surface with indicia thereon, the rotatable sleeve being configured to be placed around the body of the pacemaker lead for purposes of measuring a distance the pacemaker lead has extended from the guide catheter tip;
   b. wherein the at least one ultrasound transducer aids in determining a depth into the interventricular septum to insert the at least one anchor;
   c. wherein the indicia on the rotatable sleeve is observable to determine a depth into the interventricular septum the pacemaker lead has traveled; and
   d. wherein rotation of the sleeve translates into concurrent rotation of the pacemaker lead and the at least one anchor.

5. The kit of claim 1, wherein the ultrasound transducer comprises a single crystal ultrasound transducer.

6. The kit of claim 1, wherein the ultrasound transducer comprises a multi-crystal ultrasound transducer.

7. The kit of claim 1, further comprising one or more ultrasound transducers positioned on a side wall of the catheter body.

8. The kit of claim 1, further comprising a lead ultrasound transducer disposed on a portion of the pacemaker lead, wherein a location of a left ventricular endocardium can be visualized for exact placement of the pacemaker lead.

9. The kit of claim 8, wherein the lead ultrasound transducer is located proximate to a tip of a pacemaker lead.

10. The kit of claim 1, further comprising a recording electrode positioned on a portion of the guide catheter.

11. The kit of claim 1, where the at least one ultrasound transducer extends about an outer surface of the catheter body.

12. The kit of claim 1, wherein the at least one ultrasound transducer is positioned in a channel extending into the catheter body.

13. The kit of claim 10, wherein the recording electrode comprises an electrocardiogram electrode configured for conducting intracardiac electrocardiograms and detecting a current of cardiac injury.

* * * * *